United States Patent [19]
Snowden et al.

[11] Patent Number: 5,711,799
[45] Date of Patent: *Jan. 27, 1998

[54] ACID TOLERANT CALCIUM CARBONATE COMPOSITION AND USES THEREFOR

[75] Inventors: Kevin Snowden, Milledgeville; Jose M. Rodriguez, Eatonton; Kuan-Ting Wu, Sandersville, all of Ga.

[73] Assignee: ECC International Inc., Roswell, Ga.

[*] Notice: The term of this patent shall not extend beyond the expiration date of Pat. No. 5,531,821.

[21] Appl. No.: 614,863

[22] Filed: Mar. 13, 1996

[51] Int. Cl.⁶ ................................. C09C 1/02
[52] U.S. Cl. .............. 106/465; 106/464; 106/499; 162/181.1; 162/183; 162/181.2
[58] Field of Search ................ 106/464, 465, 106/499; 162/181.1, 181.2, 183

[56] References Cited

U.S. PATENT DOCUMENTS

| | | |
|---|---|---|
| 3,849,149 | 11/1974 | Swift et al. ................ 106/465 |
| 4,242,318 | 12/1980 | Brahm et al. . |
| 5,000,791 | 3/1991 | Tokarz et al. . |
| 5,043,017 | 8/1991 | Passaretti . |
| 5,266,163 | 11/1993 | Dessauer . |
| 5,531,821 | 7/1996 | Wu ........................... 106/464 |

OTHER PUBLICATIONS

Arnson, T.R. (1982) Tappi, vol. 65:125–30 "The Chemistry of Al Salts in Papermaking" (no month).
Thomas, R.A. (1979) Tappi, pp.29–32 "Sodium Aluminate in Paper Manufacture," Vinings Chemical Co. (no month).

*Primary Examiner*—Michael Marcheschi
*Attorney, Agent, or Firm*—Suzanne Kikel

[57] ABSTRACT

An improved form of calcium carbonate which is acid tolerant to enable its use as a filler material in the making of neutral to weakly acid paper, and a process for producing this acid tolerant calcium carbonate are provided. This acid tolerant calcium carbonate comprises a mixture of calcium carbonate with at least about 0.1 percent, based on the dry weight of the calcium carbonate, of sodium aluminate together with at least about 0.1 percent, based on the dry weight of the calcium carbonate, of one or more weak acids.

17 Claims, 11 Drawing Sheets

ACID TOLERANT CALCIUM CARBONATE COMPOSITION AND USES THEREFOR

BACKGROUND OF THE INVENTION

This invention relates generally to calcium carbonate for use in papermaking, and related industries, and more particularly to a calcium carbonate having acid tolerant properties.

Titanium dioxide and calcined clay have traditionally been utilized as filler materials in the preparation of neutral to weakly acidic paper in order to improve the optical properties, especially the brightness, of the resultant product. These materials, however, especially titanium dioxide, have the disadvantage of being very expensive, resulting in higher manufacturing costs and an uncompetitively priced paper product.

Calcium carbonate, particularly precipitated calcium carbonate, has been used as a filler material in the making of wood-free alkaline paper. Such usage results in a paper with enhanced optical properties, particularly high brightness and opacity, without the expense incurred in using titanium oxide fillers, resulting in a much less expensive product. Calcium carbonate, however, cannot generally be used as a filler in acidic paper made from mechanical pulp furnishes because it decomposes in an acidic environment. Since mechanical pulp sheets and newsprint are made in the acidic range, there has long been a need to develop a calcium carbonate composition which is acid stabilized and resistant to decomposition at low Ph, so that it can be utilized as a filler material in the manufacture of such paper, such as groundwood paper, where the use of an alkaline filler would have a negative impact on the final paper properties.

Paper made from mechanical pulps has been traditionally produced under acidic papermaking conditions because of "fiber alkaline darkening" that occurs as Ph rises. This means that there is a reduction in brightness of the paper (brightness reversion) when the pH is raised from acid to alkaline in wood-containing systems. Alkaline darkening will occur to some degree in any wood pulps with significant lignin content. The degree of darkening depends on the particular pulps, pH, and water quality. In general, ground calcium carbonate and precipitated calcium carbonate fillers buffer wet end in the 7.5–8.2 pH range. Acid-resistant calcium carbonate compositions thus provide a means for reducing the degree of fiber alkaline darkening and brightness reversion due to their ability to maintain a stabilized pH.

U.S. Pat. No. 5,043,017 discloses and claims an acid-stable calcium carbonate resistant to degradation in a mildly acidic environment which comprises a mixture of a calcium-chelating agent or a conjugate base, and a weak acid, such that calcium carbonate is coated by, and is in equilibrium with, the calcium-chelating agent or conjugate base and the weak acid. Preferred calcium carbonate compositions contain sodium hexametaphosphate and phosphoric acid.

Sodium aluminate has been used in the manufacture of paper, principally as a replacement for, or in addition to, alum, which is used to set the size. It has been noted that sodium aluminate is not an economical pH control chemical since only a small portion of the alkalinity is available as a free caustic, see, Thomas, "Sodium Aluminate in Paper Manufacture" 1979 Retention and Drainage Seminar Notes, published by Technical Association of the Pulp and Paper Industry Inc, Atlanta Ga.

OBJECTS OF THE INVENTION

It is an object of the present invention to provide an acid tolerant calcium carbonate composition especially suitable for use in papermaking applications.

It is a further object of the present invention to provide a process for the preparation of the aforesaid calcium carbonate compositions.

A still further object of the present invention is to provide a paper having enhanced optical qualities prepared using the calcium carbonate compositions of the present invention.

SUMMARY OF THE INVENTION

The present invention relates to an improved form of calcium carbonate which is acid tolerant to enable its use as a filler material in the making of neutral to weakly acid paper, and a process for producing this acid tolerant calcium carbonate. More particularly, this invention concerns an acid tolerant calcium carbonate composition comprising a mixture of calcium carbonate with at least about 0.1 percent, based on the dry weight of the calcium carbonate, of a sodium aluminate, together with at least about 0.1 percent, based on the dry weight of the calcium carbonate, of one or more weak acids. It has surprisingly been found that the inclusion of sodium aluminate together with an amount of a weak acid sufficient to neutralize the composition confers a higher degree of acid resistance for the calcium carbonate composition in the presence of fiber slurry, and a longer term of pH stability than the prior art acid-stabilized calcium carbonate compositions. In an optional embodiment, the weak acid may consist of a mixture of phosphoric acid together with an organic, polymeric acid.

DETAILED DESCRIPTION OF THE INVENTION

The improved form of calcium carbonate prepared by the instant invention is acid tolerant to enable its use as a filler material in the making of neutral to weakly acid paper. While not wishing to be bound by any particular theory as to the operability of the present invention, it is believed that the acid resistance conferred upon the calcium carbonate compositions of the present invention is a result of the inactivation of the surface of the calcium carbonate by the addition of the sodium aluminate and the weak acid.

In the practice of the present invention, the calcium carbonate compositions are rendered acid tolerant by the inclusion in the calcium carbonate composition of at least about 0.1 percent, based on the dry weight of the calcium carbonate, of sodium aluminate together with one or more weak acids in an amount which is at least about 0.1 percent, based on the dry weight of the calcium carbonate. In an optional embodiment, the weak acid may consist of a mixture of weak acids wherein at least one of the components is derived from an organic, polymeric acid.

Again not wishing to be bound by a particular theory, it is believed that the capability of the acid-stabilized calcium carbonate of the present invention to resist dissociation in an acidic environment is due to the reaction of the surface of the calcium carbonate with the sodium aluminate. This mechanism of surface inactivation is distinct from absorption or reaction of the prior art sodium hexametaphosphate on the surface of calcium carbonate, and the resultant buffering action.

The sodium aluminate utilized in the compositions of the present invention is typically an aluminate compound containing the $Al^{+3}$ ion in an ionic hydroxy- or oxo-complex. Typical forms of sodium aluminate are expressed chemically as $NaAlO_2$ or $Na_2AL_2O_4$ The amount of sodium aluminate is at least 0.1 percent based on the dry weight of the calcium carbonate, and preferably is about 0.5 to about 1.0 percent by weight, based on the dry weight of the calcium carbonate.

The amount of the sodium aluminate utilized is at least 0.1 percent, based on the dry weight of the calcium carbonate, and is preferably about 1 to about 6 percent, based on the dry weight of calcium carbonate.

The weak acid utilized in the compositions of the present invention is preferably a weak acid selected from the group consisting of phosphoric acid, metaphosphoric acid, hexametaphosphoric acid, ethylenediaminetetraacetic acid (EDTA), citric acid, sulfurous acid, boric acid, acetic acid, and mixtures thereof. As noted above, the weak acid may be a mixture of a weak acids, together with a further organic, polymeric acids, such as polyacrylic acid, polymaleic acid and polycarboxylic acid, and mixtures thereof. The organic polymeric acid is typically an organic polymer having a weight average molecular weight, $M_w$, in the range of 750–1,000,000, consisting of regularly repeating units or chemically similar units, connected by primary covalent bonds. The total amount of the weak acid utilized is at least 0.1 percent, based on the dry weight of the calcium carbonate, and is preferably about 1 to about 8 percent, based on the dry weight of the calcium carbonate. Typically, 2–4% phosphoric acid is utilized in combination with 1–6% of the organic, polymeric acid.

Preferred combinations for use in the present invention include sodium aluminate/phosphoric acid; sodium aluminate/phosphoric acid/polyacrylic acid; and sodium aluminate/phosphoric acid/polymaleic acid. Where the weak acid is a mixture, preferred combinations include 1% sodium aluminate/6% phosphoric acid/1% polyacrylic acid; and 0.5% sodium aluminate/6% phosphoric acid/1% polymaleic acid combinations.

The calcium carbonate utilized is preferably finely divided and it can be either a precipitated calcium carbonate (PCC) or a natural ground limestone (GCC).

The process for producing this acid tolerant calcium carbonate involves first adjusting the pH of the calcium carbonate to about 11 or 12, and then adding at least about 0.1 percent, based on the dry weight of the calcium carbonate, of the sodium aluminate. Then, at least about 0.1 percent, based on the dry weight of the calcium carbonate, of one or more weak acids is added to this resultant mixture. Finally, the resultant mixture is blended for a sufficiently long period of time to ensure uniform mixing of the ingredients.

The calcium carbonate can be utilized in the above-described process either as a dry powder or an aqueous slurry with up to about 60 percent by weight solids content.

The sodium aluminate can be utilized in the instant process either as a dry solid or as an aqueous solutions. When the calcium carbonate is used in dry powder form, it is preferable to utilize an aqueous solution of the sodium aluminate in order to facilitate homogeneous mixing. Where a slurry of the calcium carbonate is utilized, the solid form of the sodium aluminate readily dissolves therein so that an aqueous solution is unnecessary.

The weak acid (or acids) can be utilized in the process of preparation in either a pure concentrated form or as aqueous solutions.

The composition of the present invention can be utilized to improve the optical properties of neutral to weakly acidic paper by its addition to the paper during standard manufacturing processes. Typically, the calcium carbonate composition of the present invention is added to a first paper furnish containing components necessary for making acidic paper to thereby form a second paper furnish. The amount of the calcium carbonate composition which is added to the paper furnish is dependent upon the particular characteristics of the particular furnish, and the desired degree of brightness desired in the finished product. Representative amounts of the composition for typical paper furnishes range from about 1 to about 15% by weight of the finished product weight. Most preferably, the calcium carbonate compositions are utilized in the range of about 5 to about 10% by weight of the finished product.

The invention will be further illustrated by the following Examples, which are to be considered illustrative of the invention, and not limited to the precise embodiments shown.

EXAMPLE 1

Calcium Carbonates for Wood Containing Furnishes

To demonstrate the utility of the compositions of the present invention in the use of paper such as mechanical pulp sheets and newsprint, made in the acidic pH range, the following experiments were conducted with wood containing paper furnishes which normally experience alkaline darkening and calcium carbonate decomposition at acidic pHs.

Experimental

I. Brightness Pads Acid Tolerant Precipitated Calcium Carbonate Composition (ATPCC)

To a carbonate slurry, 1% of sodium aluminate was added. This resultant slurry containing the sodium aluminate was mixed at 250 rpm for 1 hour. At the end of the mixing, 4% of phosphoric acid was added. The slurry was stirred for 1 minute and aged without stirring for an additional 3 hours.

Pad Formation

1. Variable pH

The pulp slurry (0.5% consistency) was adjusted to the desired pH with phosphoric acid or sodium hydroxide. The stock utilized was obtained from a mechanical pulp mill in the South. The calcium carbonate composition was added to the pulp slurry and it was gently mixed (200 rpm) for 30 minutes. Afterwards, it was stirred at 950 rpm for 30 sec. The slurry was filtered in a Buchner filter equipped with a Whatman 41 filter paper. The pads were double pressed and dried in the drum drier. The brightness of each pad was measured with a Teledyne Micro S-5.

2. Constant pH

The pH of the pulp (Consistency=0.5%) was adjusted to 7.0 or 6.5 with sodium hydroxide or dilute phosphoric acid. The stock was the same as the one used in the previous experiments. After adjusting the pH, a known amount of calcium carbonate was added to the previously described furnish. The pH was kept constant by periodic additions of 5% phosphoric acid to the slurry. The slurry was slowly mixed and the pH kept constant for ½ hour. The weight of the phosphoric acid used to keep the pH constant was recorded at the end of each experiment. Afterwards the slurry was mixed at a high speed of 950 rpm for 30 seconds. A brightness pad was formed by pouring the slurry through a Buchner funnel equipped with a Whatman 42 ashless filter. The pads were pressed twice and dried in a drum drier (two passes). Again, the brightness was measured with a Teledyne Micro S-5.

II. M/K Sheet Former M/K Sheet Former Parameters

An M/K Series 9000 Computerized Sheet Former was used for making sheets. The sheet former consist of a forming and pressing/drying sections, a white water recirculation system and a chemicals and stock feed system. The furnish consisted of deinked recycled newspaper from a southern mill. The basis sheet weight was kept constant. Eighty percent of the white paper was recycled for the making of the sheets. The pH of the white water was kept constant at 6.5. This was accomplish by adding phosphoric acid to the white water holding tank.

The calcium carbonate/1% sodium aluminate/4% phosphoric acid composition was prepared as described in part I of this example.

III. Herty Foundation Trial

A trial was conducted in a No. 1 Pilot Paper Machine. This machine is a conventional 36" low speed fourdrinier machine. The furnish was obtained by repulping newspaper from a Wester Canadian newsprint mill. The basis weights of the produced final sheet was around 45 gsm. The speed was 175 fpm. The retention aide consisted of a dual polymer system. The addition rate was of 0.2 to 0.3 #/Ton of Eclipse 1200 and Stylus 100.

Paper Machine Running Parameters

The paper machine running parameters are given in Table I below. A 5% Phosphoric Acid solution was added at in the paper machine tray white water to control the headbox pH.

TABLE I

Hearty Newsprint Trial

| Date | Time | Filter Type | Addition % | pH | °C. | Specific Conduct. mV | PCD | Zeta Potential mV | Consist. % | Ash % | Drain Time 50 ml sec | 100 ml sec |
|---|---|---|---|---|---|---|---|---|---|---|---|---|
| | | | | | | | | Head Box | | | | |
| 13 Nov | 3:00 PM | Unfilled | | 5.96 | 23 | 0.122 | 0.9 | −13.44 | | | | |
| 13 Nov | 4:10 PM | Unfilled | | 3.6 | 29 | 0.267 | 0.7 | −16.75 | 0.40 | 1.65 | 6 | 36 |
| | 7:15 PM | Unfilled | | 3.6 | 31 | 0.365 | 0.25 | −13.65 | 0.43 | 1.84 | 8 | 40 |
| 13 Nov | 9:15 PM | Unfilled | | 4.4 | 27 | 0.145 | 1 | −20.94 | 0.48 | 0.69 | 12 | 570 |
| 15 Nov | 9:30 AM | Untreated PCC | 3.00 | 6.5 | 28 | 0.196 | 1.05 | −19.81 | 0.50 | 2.61 | 9 | 70 |

TABLE I-continued

Hearty Newsprint Trial

| Date | Time | Filter Type | Addition % | pH | °C. | Specific Conduct. mV | PCD | Zeta Potential mV | Consist. % | Ash % | Drain Time 50 ml sec | 100 ml sec |
|---|---|---|---|---|---|---|---|---|---|---|---|---|
| 15 Nov | 10:00 AM | Untreated PCC | 6.00 | 6.8 | 26 | 0.196 | 1 | −21.07 | 0.50 | 6.50 | 12 | 70 |
| 15 Nov | 10:20 AM | Untreated PCC | 11.20 | 8.5 | 26 | 0.198 | 0.9 | −23.78 | 0.61 | 9.22 | 12 | 70 |
| 15 Nov | 3:10 PM | ECCI-ATPCC | 4.80 | 6.5 | 26 | 0.349 | 0.5 | −18.91 | 0.48 | 4.13 | 8 | 45 |
| 15 Nov | 3:30 PM | ECCI-ATPCC | 10.10 | 6.7 | 26 | 0.365 | 0.45 | −18.03 | 0.48 | 6.14 | 9 | 45 |
| 15 Nov | 3:55 PM | ECCI-ATPCC | 6.60 | 6.6 | 26 | 0.35 | 0.4 | −24.04 | 0.49 | 3.67 | 8 | 45 |
| | | | | | | | | Tray | | | | |
| 13 Nov | 3:00 PM | Unfilled | | | 25 | 0.260 | 0.60 | −15.66 | | | | |
| 13 Nov | 4:10 PM | Unfilled | | 3.7 | 31 | 0.307 | 0.90 | −16.67 | 0.01 | 4.76 | 97.60 | 92.70 |
| | 7:15 PM | Unfilled | | 4.3 | 30 | 0.144 | 0.30 | −19.58 | 0.02 | 6.56 | 95.35 | 85.95 |
| 13 Nov | 9:15 PM | Unfilled | | 6.7 | 27 | 0.191 | 0.90 | −20.92 | 0.08 | 3.67 | 83.33 | 11.35 |
| 15 Nov | 9:30 AM | Untreated PCC | 3.00 | 6.4 | 26 | 0.191 | 1.15 | −19.29 | 0.08 | 11.39 | 84.00 | 30.18 |
| 15 Nov | 10:00 AM | Untreated PCC | 6.00 | 6.6 | 24 | 0.192 | 0.90 | −19.18 | 0.10 | 20.59 | 80.00 | 36.65 |
| 15 Nov | 10:20 AM | Untreated PCC | 11.20 | 8.5 | 24 | 0.322 | 0.45 | −23.17 | 0.13 | 24.31 | 74.61 | 32.70 |
| 15 Nov | 3:10 PM | ECCI-ATPCC | 4.80 | 6.6 | 25 | 0.343 | 0.40 | −18.79 | 0.07 | 11.43 | 85.42 | 59.64 |
| 15 Nov | 3:30 PM | ECCI-ATPCC | 10.10 | 6.7 | 26 | 0.329 | 0.40 | −19.40 | 0.08 | 17.10 | 83.33 | 53.68 |
| 15 Nov | 3:55 PM | ECCI-ATPCC | 6.60 | 6.7 | 26 | 0.35 | 0.4 | −21.54 | 0.07 | 22.86 | 85.71 | 11.02 |

Physical Properties of the Calcium Carbonates The physical properties of the calcium carbonates are given in Table 2 below.

TABLE II

Physical Properties of Fillers

| | ECCI-ATPCC | PCC |
|---|---|---|
| Brightness | 94.1 | 94.9 |
| L | 97.76 | 98.19 |
| a | −0.04 | 0.03 |
| b | 1.49 | 0.93 |
| BET | 11.2 | 7.4 |
| Blaine | 25,478 | 25,300 |
| PSD | | |
| % <10.00 | 94 | 99 |
| % <5.00 | 68 | 99 |
| % <2.00 | 20 | 54 |
| % <1.00 | 12 | 15 |
| % <0.5 | 10 | 9 |
| % <0.25 | 10 | 9 |

The calcium carbonate/sodium aluminate/phosphoric acid composition was prepared as described in Part I of this example.

IV. Syracuse Trial (State University of New York-College of Environmental Sciences and Forestry).

Acid Tolerant Calcium Carbonate Composition

The acid tolerant calcium carbonate was prepared as described in Section I.

Running Parameters

Newsprint from Western Canada was repulped in the Barracuda Pulper. The pH was immediately adjusted to 5.0 with concentrated sulfuric acid. After transferring the furnish to the high consistency storage tanks, the pH was again adjusted to 5.0 with concentrated sulfuric acid. From the high consistency tanks, the pulp was diluted to low consistency in the feed tank that was situated before the fan pump. The pH was adjusted to the desired headbox pH by adding 0.5% phosphoric acid to the head of the fan pump. The flow of the phosphoric was recorded for each pH and filter level. The calcium carbonate was added at a "T" joint between the fan pump and the headbox. The pH was measured at a tab on the headbox. The gramage of the produced paper was kept around 45 gsm. The formation was around 45.

Results and Conclusions

I. Brightness Pads

Unadjusted pH

Figure 1:
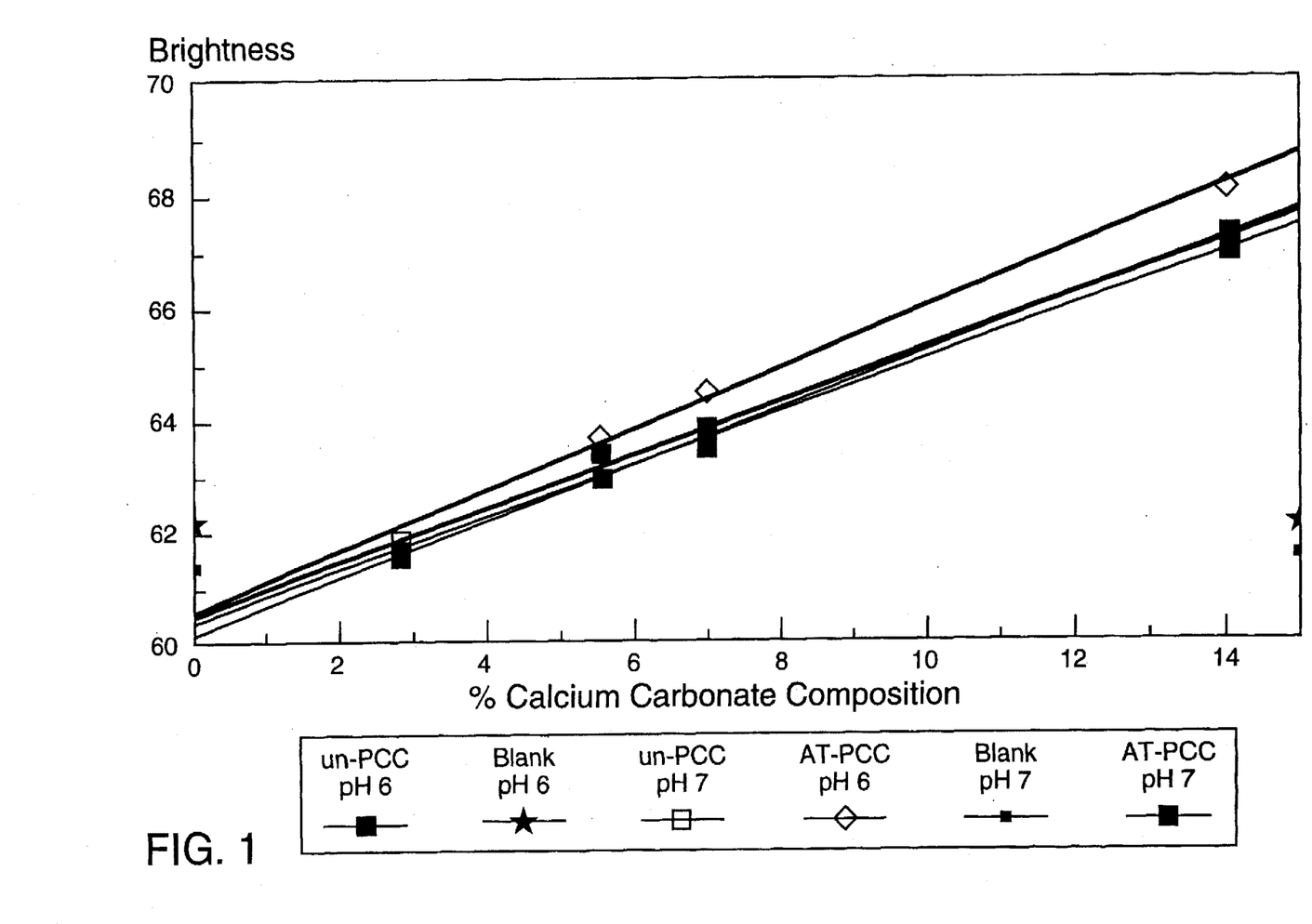
FIG. 1 is a graph comparing the brightness of pads made with various amounts of untreated calcium carbonate compositions (designated as un-PCC) to the brightness of pads made with various amounts of an acid tolerant precipitated calcium carbonate/sodium aluminate/phosphoric acid composition (designated as ECCI-ATPCC).
Figure 2:
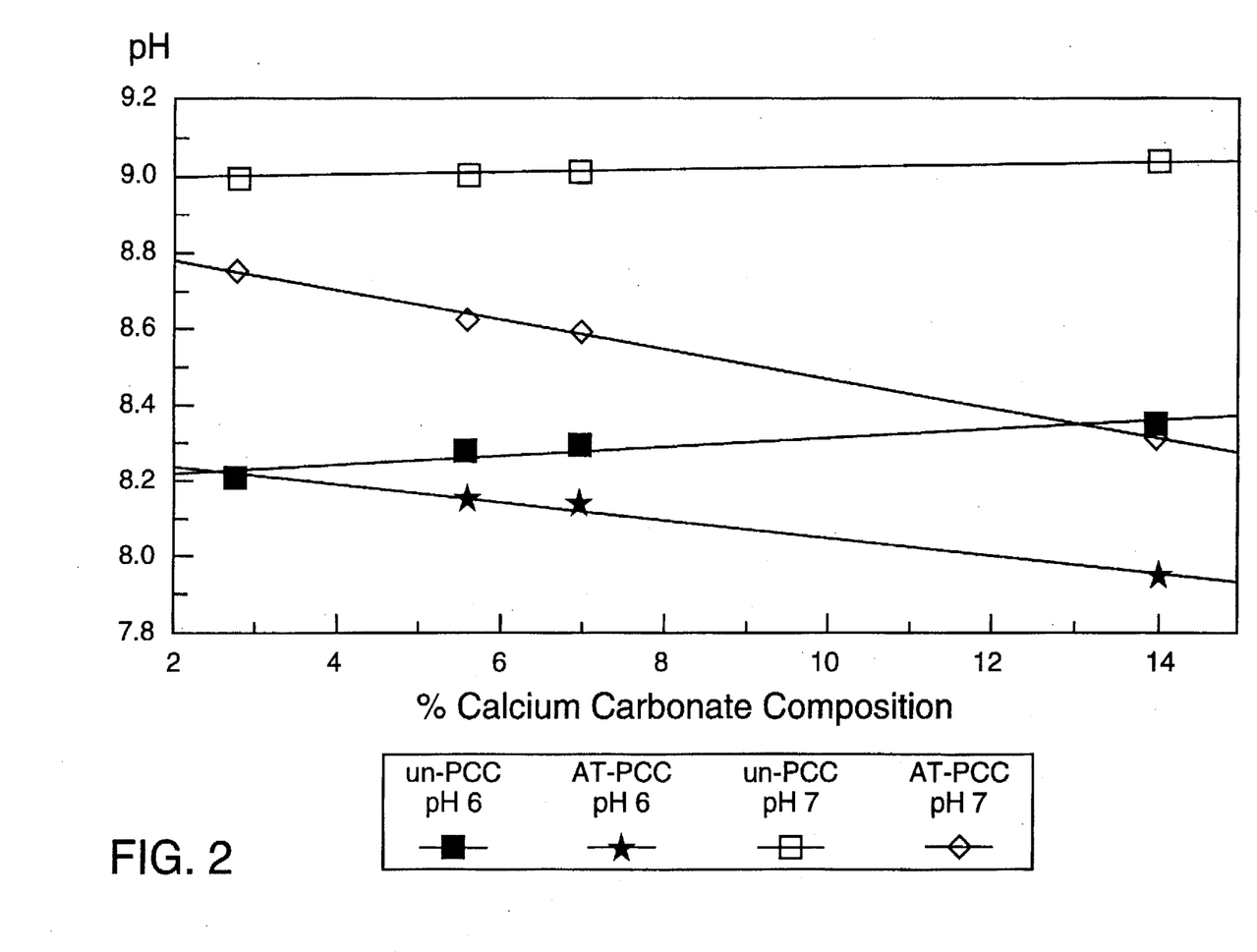
FIG. 2 is a graph comparing the pH of the pads made with various amounts of untreated calcium carbonate compositions (designated as un-PCC) to the pH of pads made with various amounts of an acid tolerant precipitated calcium carbonate/sodium aluminate/phosphoric acid composition (designated as ECCI-ATPCC).

In our first investigation, the initial pH was pH 6.0 or 7.0; but it was allowed to drift. The results for the acid tolerant PCC and untreated PCC samples are given in FIG. 1. The brightness increase for all of the samples was the same. This can be explained by observing the pH changes. For all of the samples, the pH went up, as shown in the graph of FIG. 2. The amount was dependent on treatment and concentration of the PCC. The brightness vs. pH curve for mechanical pulps is a typical "S" curve with the equivalent point around pH 7. At pH of 7.5, the brightness decreases to an almost constant level; therefore, since, all of the samples drifted to pHs higher than 8, alkaline darkening was observed in all of the samples. It was therefore concluded that it is necessary to adjust the system pH so that the pH does not drift.

Constant pH

1. Acid Composition

Figure 3:
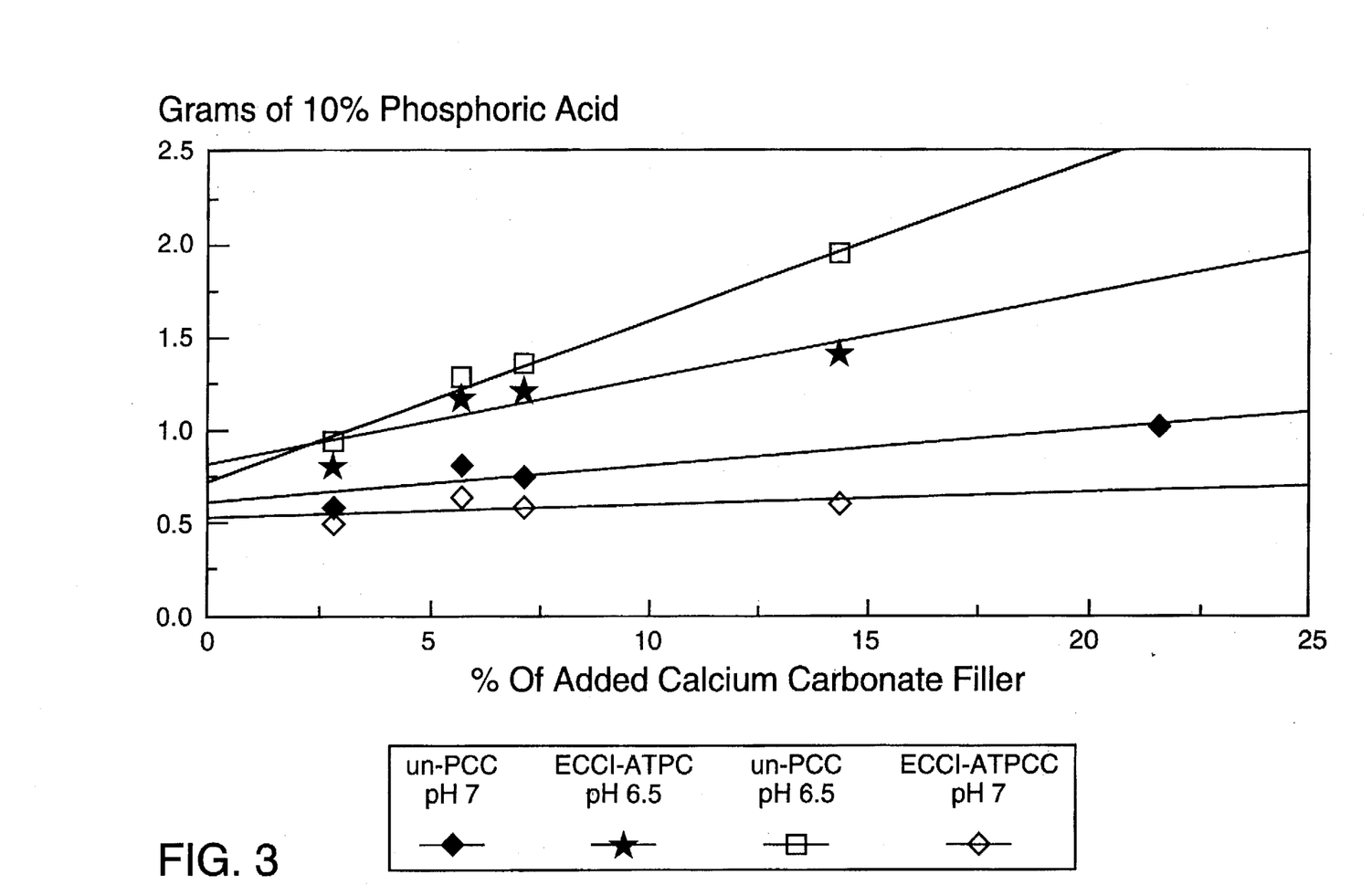
FIG. 3 is a graph comparing the various amounts of phosphoric acid needed to "buffer" the system at the desired pH (6.5 or 7.0).

The use of various amounts of phosphoric acid to "buffer" the system at the desired pH (6.5 or 7.0) is shown in the graph of FIG. 3. At pH 7.0, the amount of phosphoric acid consumed was about ½ the amount of acid used up at pH 6.5. The acid tolerant precipitated calcium carbonate composition (AT-PCC) consumed less phosphoric acid than the untreated PCC.

2. Brightness

Figure 4:
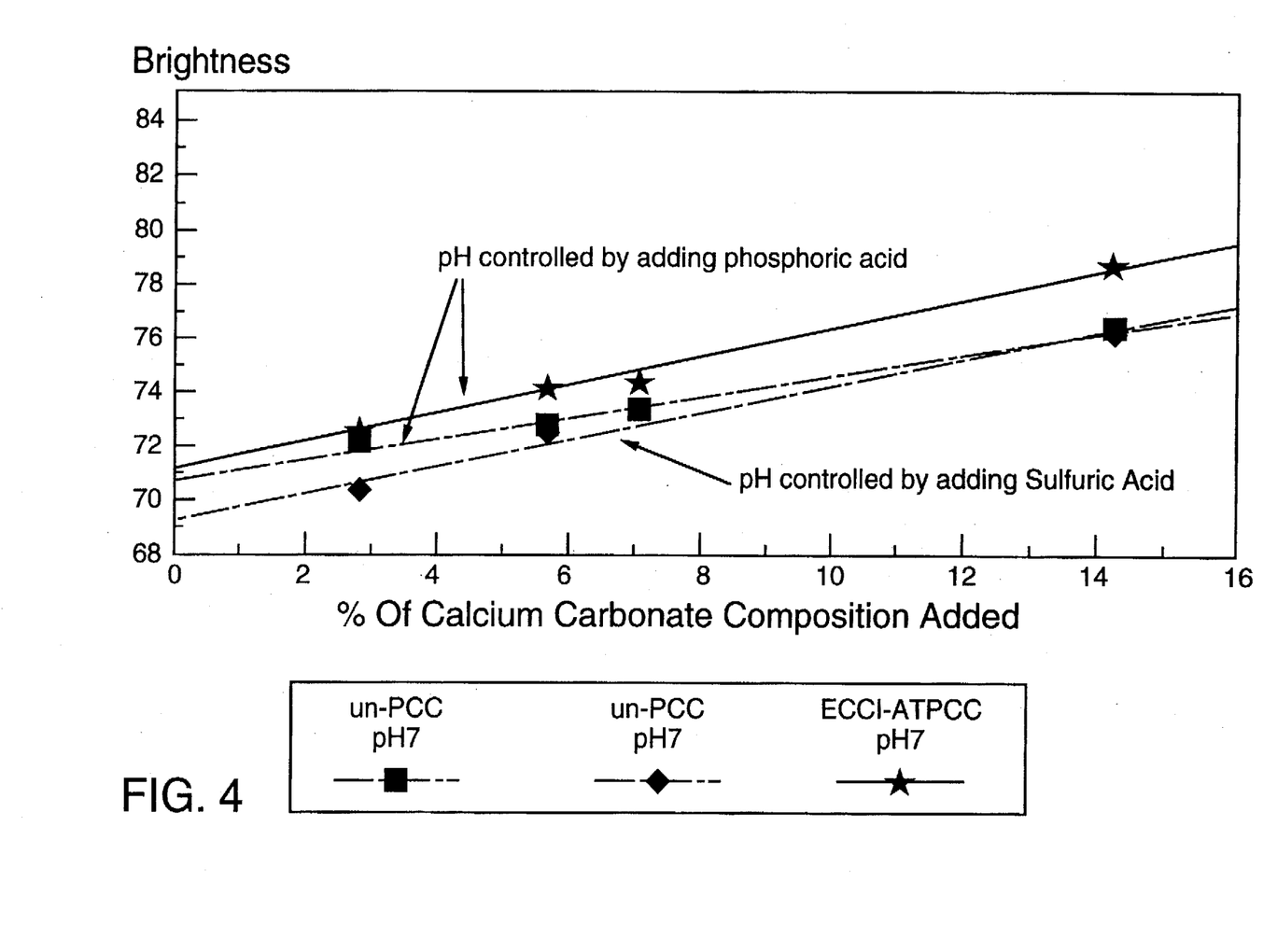
FIG. 4 is a graph comparing the brightness of the pads produced using various amounts of untreated precipitated calcium carbonate compositions (designated as un-PCC), and pads produced using various amounts of acid tolerant precipitated calcium carbonate/sodium aluminate/phosphoric acid compositions (designated as ECCI-ATPCC).
Figure 5:
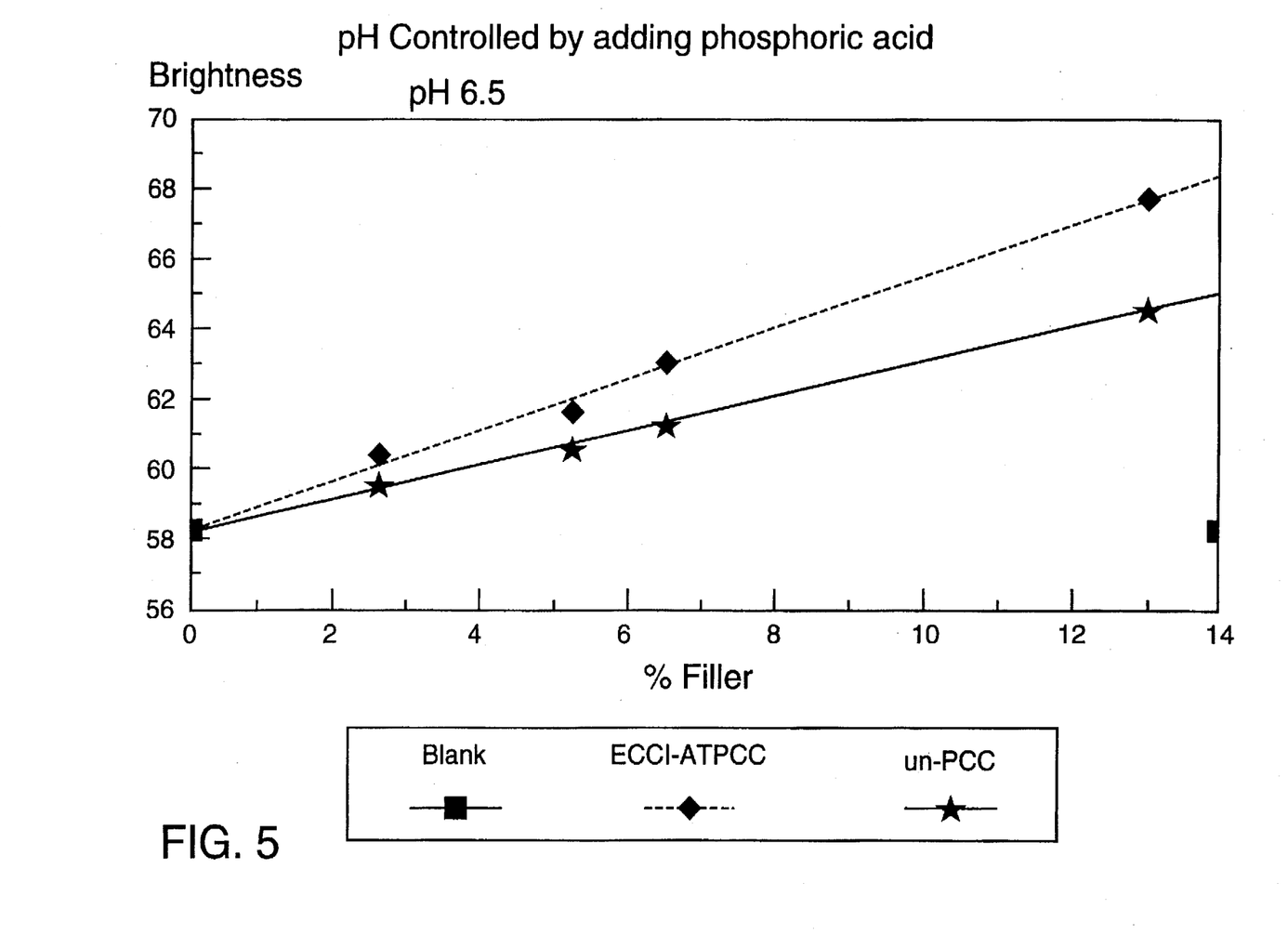
FIG. 5 is a graph comparing the brightness of the pads produced using various amounts of untreated precipitated calcium carbonate compositions (designated as un-PCC), and pads produced using various amounts of acid tolerant precipitated calcium carbonate/sodium aluminate/phosphoric acid compositions (designated as ECCI-ATPCC).

Several conclusions can be reached by analyzing the graphs shown in FIGS. 4 & 5:

a. Phosphoric acid imparts a degree of acid tolerance to the calcium carbonate. The furnishes that were adjusted with phosphoric acid have higher brightness and the curve intercept at the blanks brightness.

b. It takes approximately 4% of untreated scalenohedral calcium carbonate in a non-phosphoric acid system to reach the original blank brightness.

II. M/K Sheet Formation

Figure 6:
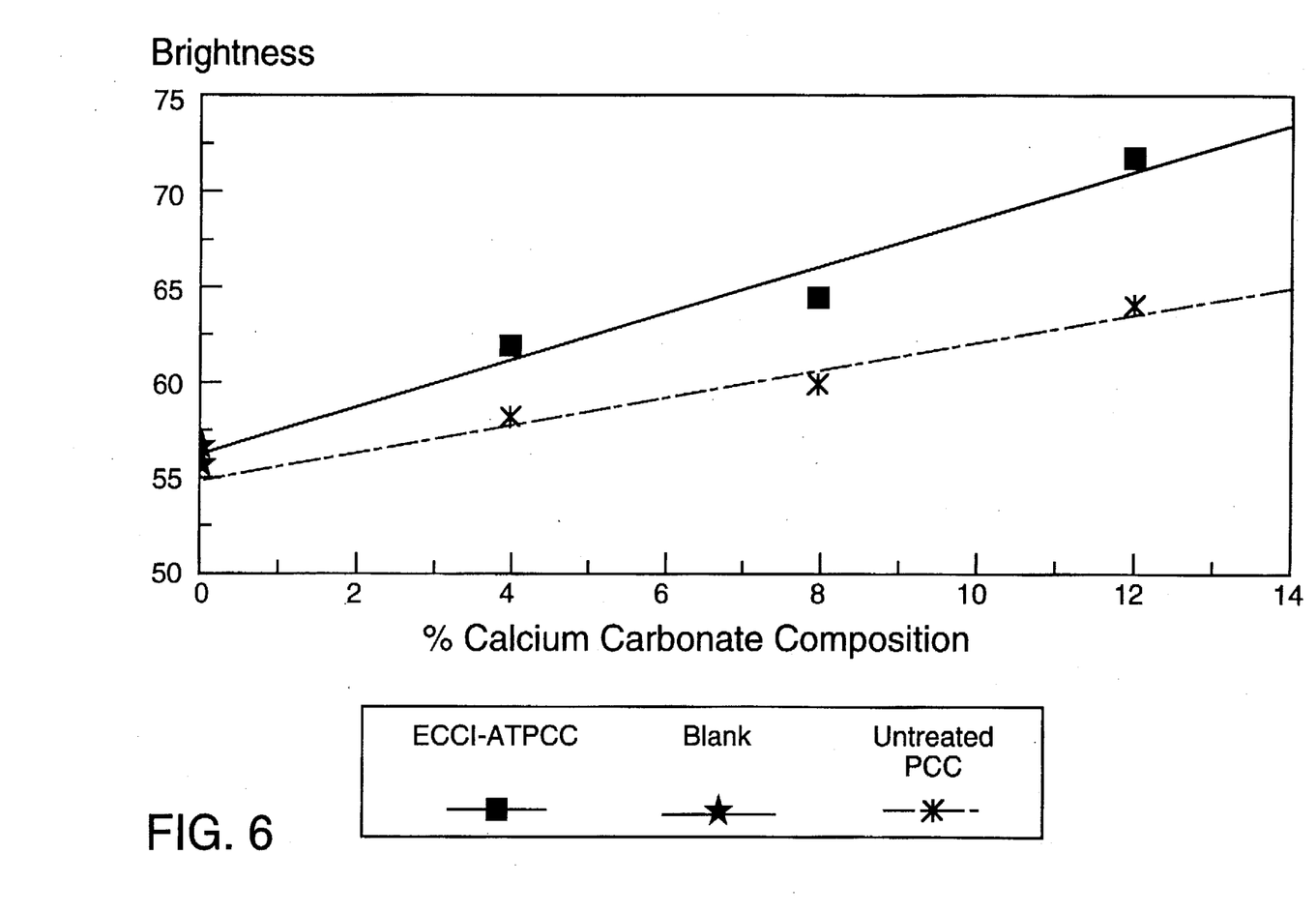
FIG. 6 is a graph comparing the brightness of sheets formed using various amounts of an untreated precipitated calcium carbonate composition (designated as untreated PCC) to sheets formed using various amounts of an acid tolerant precipitated calcium carbonate/sodium aluminate/phosphoric acid composition (designated as ECCI-ATPCC).

The results, shown by the graph of FIG. 6, obtained with the M/K Sheet Former validated the previous conclusions. The samples containing the acid tolerant calcium carbonate/sodium aluminate/phosphoric acid composition gave the higher brightness.

III. Herty Foundation Trial

Figure 7:
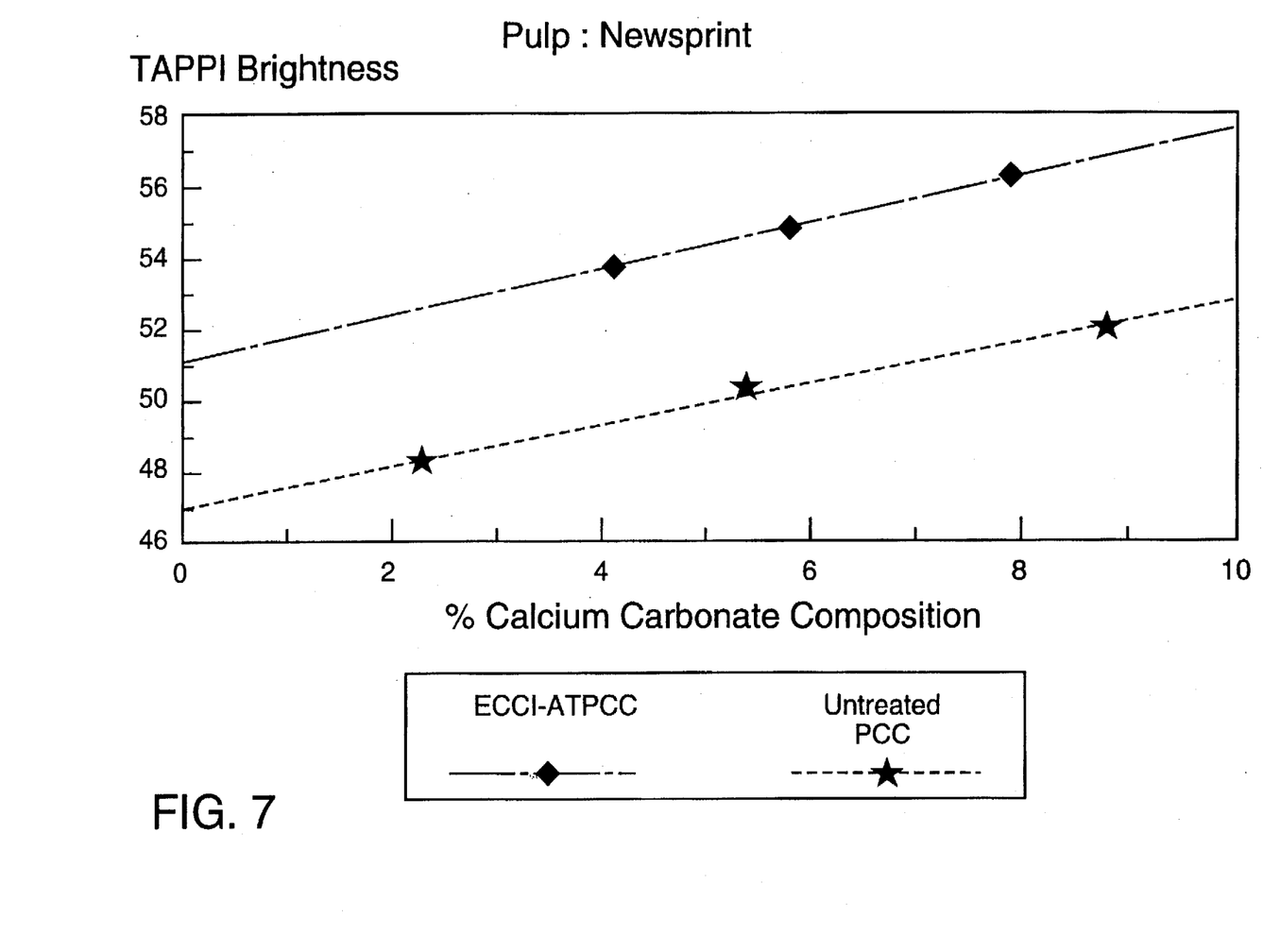
FIG. 7 is a graph comparing the TAPPI brightness of pulp:newsprint formed using various amounts of an untreated precipitated calcium carbonate composition (designated as untreated PCC) to sheets formed using various amounts of an acid tolerant precipitated calcium carbonate/sodium aluminate/phosphoric acid composition (designated as ECCI-ATPCC).

The results are plotted in the graph shown in FIG. 7. The performance of the acid tolerant precipitated calcium carbonate/sodium aluminate/phosphoric acid composition outperformed the untreated calcium carbonate samples. The brightness results obtained in this trial were similar to the brightness pads experiments. The brightness curves for these two samples parallel each other and it requires approximately 4% of untreated precipitated calcium carbonate to get back to the original blank brightness.

IV. Syracuse Trial (State University of New York-College of Environmental Science and Forestry)

Figure 8:
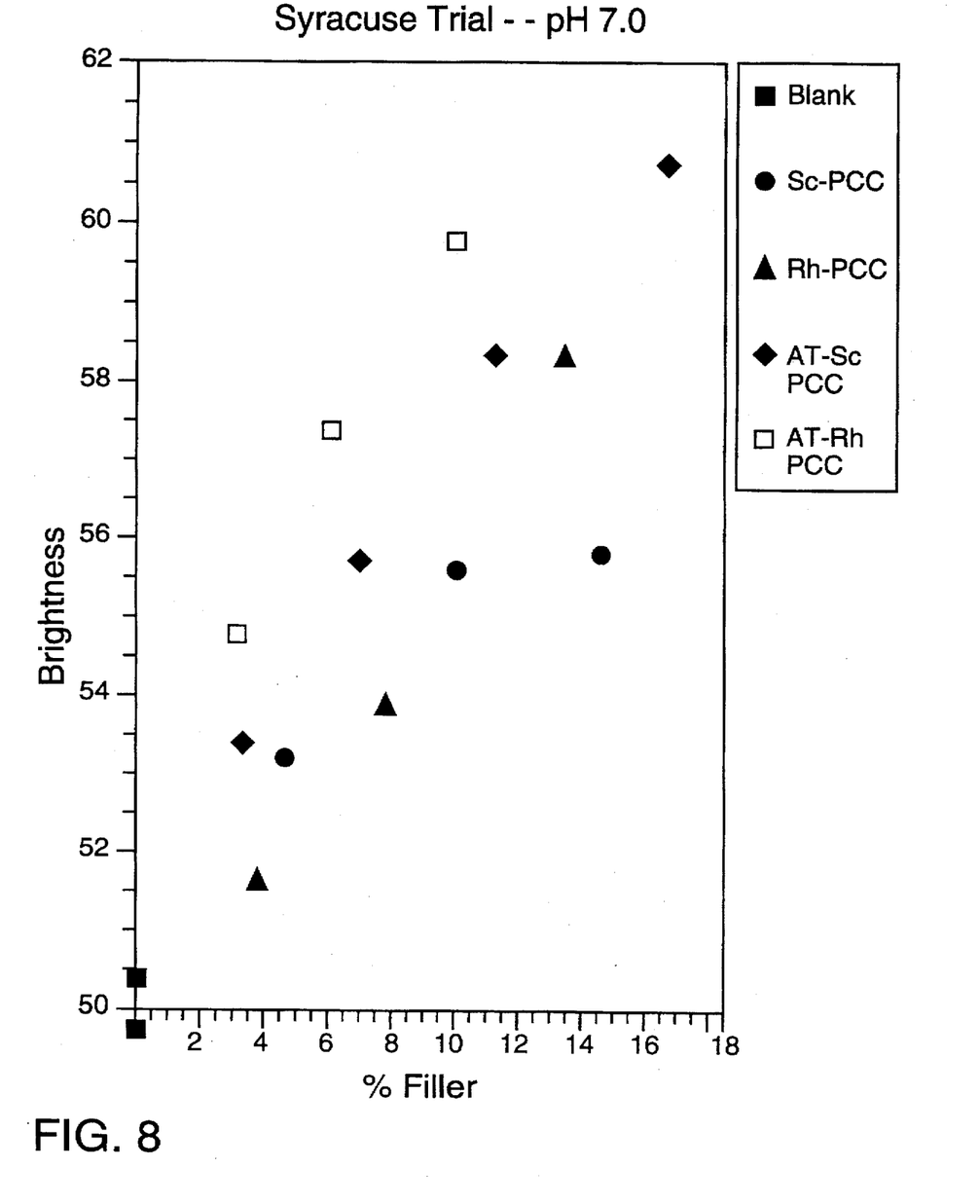
FIG. 8 is a plot comparing the brightness of paper formed using various amounts of differing forms of untreated calcium carbonate compositions (designated as Sc-PCC [scalenohedral precipitated calcium carbonate], Rh-PCC [rhombic precipitated calcium carbonate], to paper formed using various amounts of differing forms of an acid tolerant calcium carbonate composition (designated as AT-Sc-PCC [acid tolerant scalenohedral precipitated calcium carbonate/sodium aluminate/phosphoric acid composition] or AT-Rh-PCC [acid tolerant rhombic precipitated calcium carbonate/sodium aluminate/phosphoric acid composition]).
Figure 9:
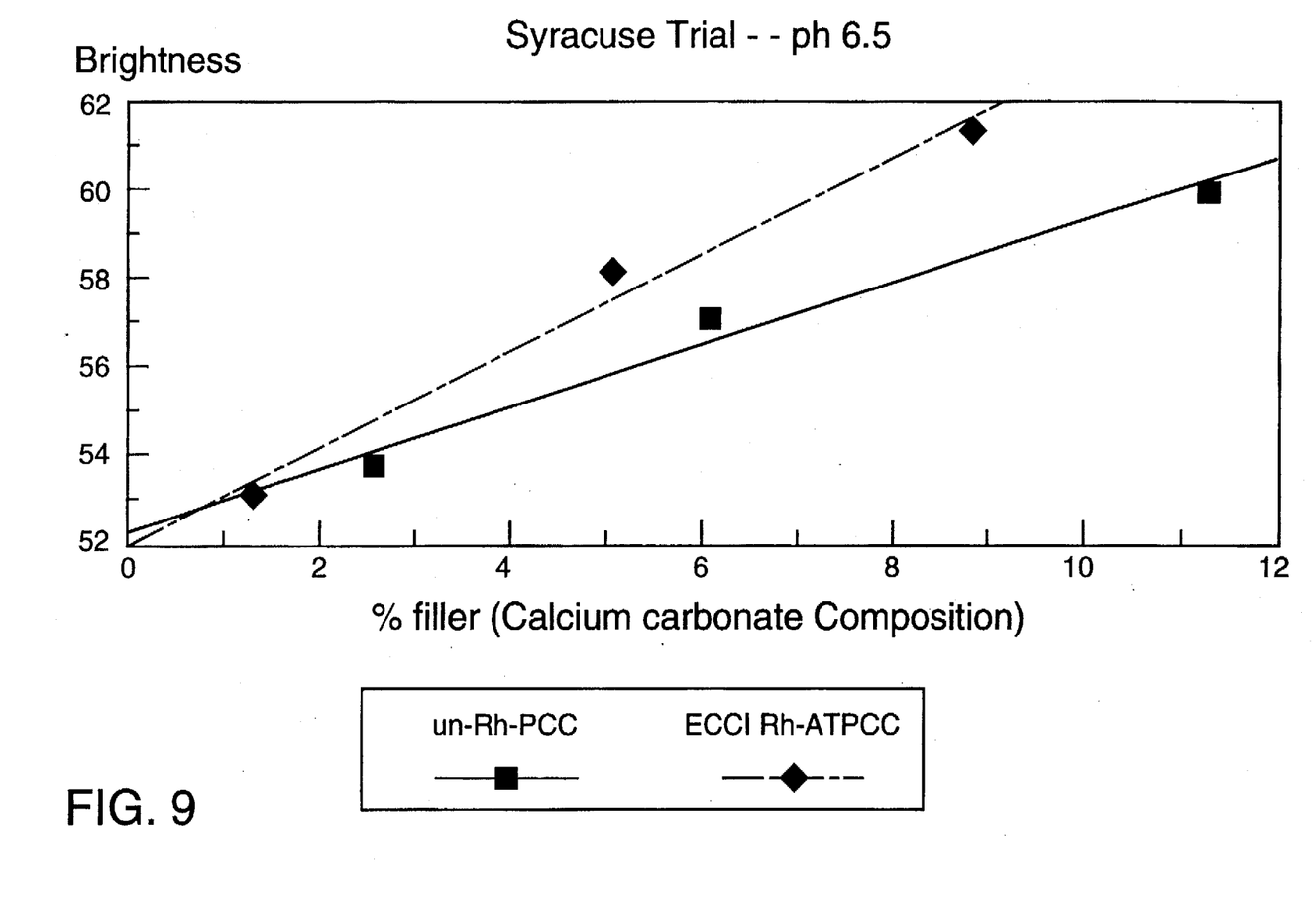
FIG. 9 is a graph comparing the brightness of paper formed using various amounts of rhombic untreated calcium carbonate compositions (designated as un-Rh-PCC) to paper formed using various amounts of an acid tolerant rhombic calcium carbonate composition (designated as ECCI Rh-ATPCC).

At a pH of 7.0, the data shown by the plot of FIG. 8 and the graph of FIG. 9 clearly shows two trends. The acid tolerant calcium carbonates showed a greater brightness than the corresponding untreated calcium carbonates.

The rhombic calcium carbonate compositions showed some advantages; however, these advantages may be attributed to the condition of the furnish.

At a pH of 6.5, the treated calcium carbonate rhombic samples outperformed the untreated rhombic samples.

EXAMPLE 2

Ground Calcium Carbonate Compositions

Acid tolerant ground calcium carbonate slurry can be obtained by the addition of sodium aluminate, followed by the addition of a weak acid such as phosphoric acid and a polymeric acid such as polyacrylic acid.

Figure 10:
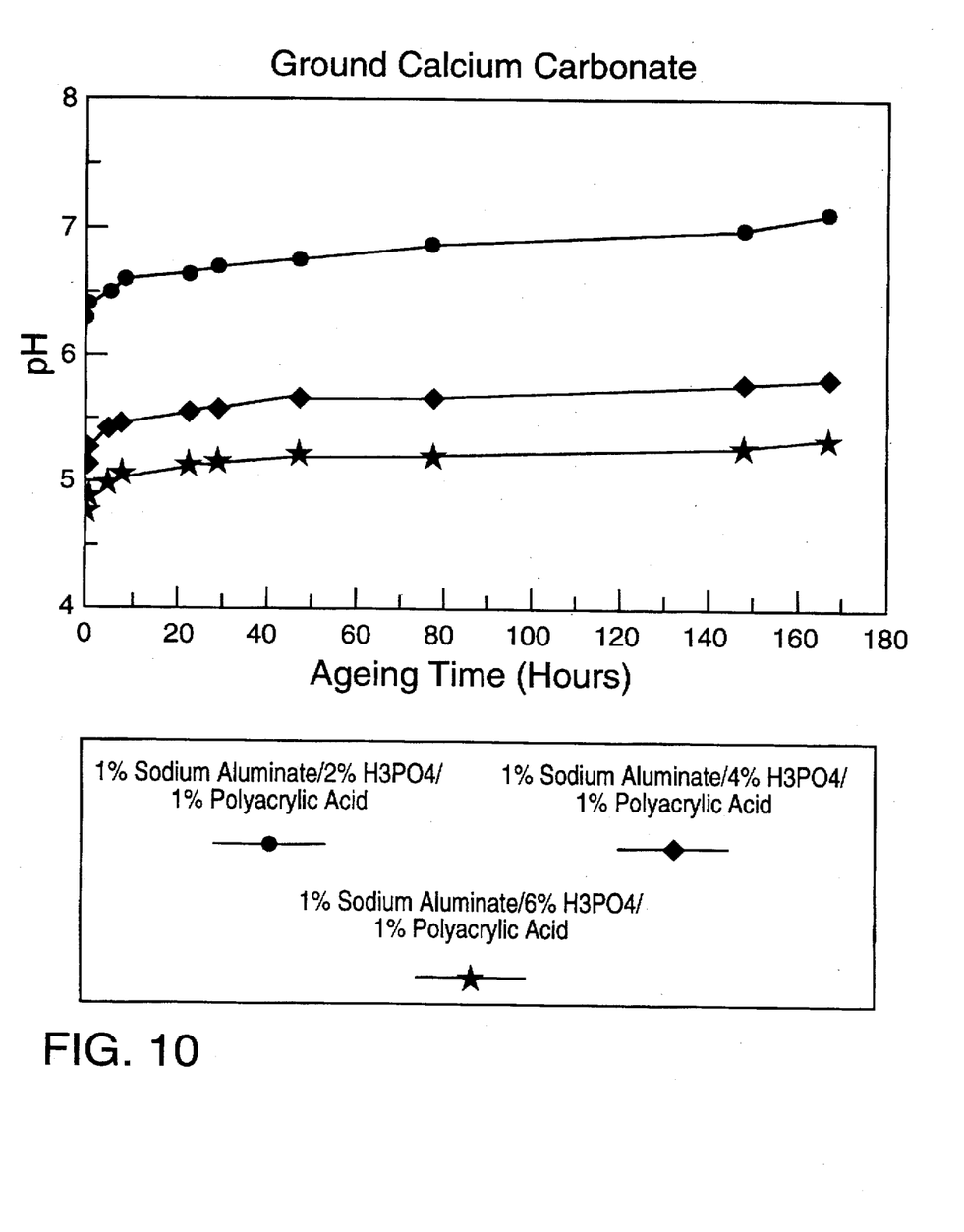
FIG. 10 is a graph comparing the pH during ageing of an acid tolerant ground calcium carbonate composition containing 1% sodium aluminate, 2% phosphoric acid and 1% polyacrylic acid, with an acid tolerant ground calcium carbonate composition containing 1% sodium aluminate, 4% phosphoric acid and 1% polyacrylic acid, and an acid tolerant ground calcium carbonate composition containing 1% sodium aluminate, 6% phosphoric acid and 1% polyacrylic acid over a period of 180 hours.

Initially, 1% sodium aluminate, based on the dry weight of calcium carbonate, was added into a 20% solids slurry of ground calcium carbonate. The initial pH of the calcium carbonate slurry was 8.01. After mixing, 2–6% phosphoric acid and 1% polyacrylic acid, based on the dry weight of calcium carbonate, were added. A plot of the pH was measured for each sample after 167 hours ageing, as shown graphically in FIG. 10. The initial pH of the slurry treated with 1% sodium aluminate/1% polyacrylic acid/4% phosphoric acid was measured and found to be 5.12. After 167 hours of ageing, the pH was again measured and found to be 5.83.

EXAMPLE 3

Scalenohedral Precipitated Calcium Carbonate Compositions

Acid tolerant scalenohedral precipitated calcium carbonate slurry can be obtained by the addition of sodium aluminate, followed by the addition of a weak acid such as phosphoric acid and a polymeric acid such as polymaleic acid.

Figure 11:
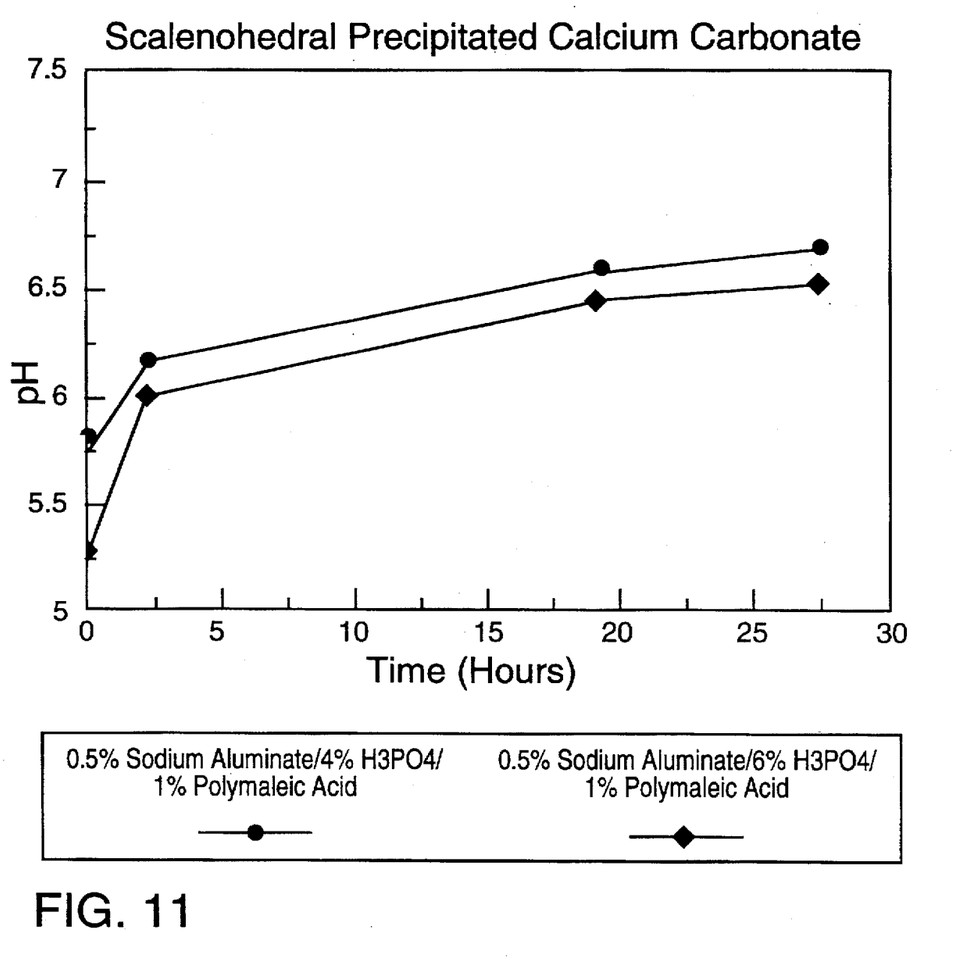
FIG. 11 is a graph comparing the pH during ageing of an acid tolerant scalenohedral precipitated calcium carbonate composition containing 0.5% sodium aluminate, 4% phosphoric acid and 1% polyacrylic acid, with an acid tolerant scalenohedral precipitated calcium carbonate composition containing 0.5% sodium aluminate, 6% phosphoric acid and 1% polymaleic acid.

Initially, 0.5% sodium aluminate, based on the dry weight of calcium carbonate, was added into a 19.7% solids slurry of scalenohedral precipitated calcium carbonate. The initial pH of the calcium carbonate slurry was 8.83. After mixing, 4–6% phosphoric acid and 1% polymaleic acid, based on the dry weight of calcium carbonate, were added. A plot of the pH was measured for each sample after 27 hours ageing, as shown graphically in FIG. 11. The initial pH of the slurry treated with 0.5% sodium aluminate/1% polymaleic acid/4% phosphoric acid was measured and found to be 5.76. After 27 hours of ageing, the pH was again measured and found to be 6.69

EXAMPLE 4

Ground Calcium Carbonate Compositions

Acid tolerant ground calcium carbonate slurry can be obtained by the addition of sodium aluminate, followed by the addition of a weak acid such as phosphoric acid and a polymeric acid such as polyacrylic acid.

Initially, 3% sodium aluminate, based on the dry weight of calcium carbonate, was added into a 20% solids slurry of ground calcium carbonate. The initial pH of the calcium carbonate slurry was 8.01. After mixing, 6% phosphoric acid and 1% polyacrylic acid, based on the dry weight of calcium carbonate, were added. The initial pH of the slurry was measured and found to be 6.29. After 65 hours of ageing, the pH was again measured and found to be 6.74.

EXAMPLE 5

Ground Calcium Carbonate Compositions

Acid tolerant ground calcium carbonate slurry can be obtained by the addition of sodium aluminate, followed by the addition of a weak acid such as phosphoric acid and a polymeric acid such as polyacrylic acid.

Initially, 1% sodium aluminate, based on the dry weight of calcium carbonate, was added into a 20% solids slurry of ground calcium carbonate. The initial pH of the calcium carbonate slurry was 8.01. After mixing, 1% phosphoric acid and 6% polyacrylic acid, based on the dry weight of calcium carbonate, were added. The initial pH of the slurry was measured and found to be 6.02. After 64 hours of ageing, the pH was again measured and found to be 6.59.

What is claimed is:

1. An acid tolerant calcium carbonate composition comprising a mixture of calcium carbonate with at least about 0.1 percent, based on the dry weight of the calcium carbonate, of sodium aluminate, together with at least about 0.1 percent, based on the dry weight of the calcium carbonate, of one or more weak acids.

2. The acid tolerant calcium carbonate composition of claim 1 wherein the weak acid is selected from the group consisting of phosphoric acid, and mixtures of phosphoric acid with a polymeric weak acid selected from the group consisting of polyacrylic acid, polymaleic acid, polycarboxylic acid, and mixtures thereof.

3. The acid tolerant calcium carbonate composition of claim 1 wherein the weak acid is phosphoric acid.

4. The acid tolerant calcium carbonate composition of claim 1 wherein the weak acid is a mixture of phosphoric acid and a polyacrylic acid.

5. The acid tolerant calcium carbonate composition of claim 1 wherein the weak acid is a mixture of phosphoric acid and polycarboxylic acid.

6. The acid tolerant calcium carbonate composition of claim 1 wherein the sodium aluminate is present in an amount of about 1 to about 6 percent, based on the dry weight of the calcium carbonate.

7. The acid tolerant calcium carbonate composition of claim 1 wherein the weak acid is present in an amount of about 1 to about 8 percent, based on the dry weight of the calcium carbonate.

8. A process for a preparation of an acid tolerant calcium carbonate which comprises:

a) adjusting a pH of a slurry of calcium carbonate to about 11 or 12;

b) adding thereto, with mixing, at least about 0.1 percent, based on the dry weight of the calcium carbonate, of sodium aluminate;

c) adding to the mixture of b, with mixing, an amount of a weak acid sufficient to bring the pH of a resultant mixture to about 7 or lower.

9. The process according to claim 8 wherein the weak acid is selected from the group consisting of phosphoric acid, and mixtures of phosphoric acid with a polymeric weak acid selected from the group consisting of polyacrylic acid, polymaleic acid, polycarboxylic acid, and mixtures thereof.

10. The process according to claim 8 wherein the weak acid is phosphoric acid.

11. The process according to claim 8 wherein the weak acid is a mixture of phosphoric acid and polyacrylic acid.

12. The process according to claim 8 wherein the weak acid is a mixture of phosphoric acid and polymaleic acid.

13. The process according to claim 8 wherein the weak acid is a mixture of phosphoric acid and a polycarboxylic acid.

14. The process according to claim 8 wherein the sodium aluminate is present in an amount of about 1 to about 6 per cent, based on the dry weight of the calcium carbonate.

15. The process according to claim 8 wherein the weak acid is present in an amount of about 1 to about 8 per cent, based on the dry weight of the calcium carbonate.

16. A method of improving optical properties of neutral to weakly acidic paper by the addition of the composition of claim 1.

17. The acid tolerant calcium carbonate composition of claim 1 wherein the weak acid is a mixture of phosphoric acid and polymaleic acid.

* * * * *